R. F. LINDENMUTH.
AUTOMATIC PADLOCK.
APPLICATION FILED DEC. 17, 1918.
1,335,586.
Patented Mar. 30, 1920.
4 SHEETS—SHEET 1.
Fig. 1.
Fig. 2.
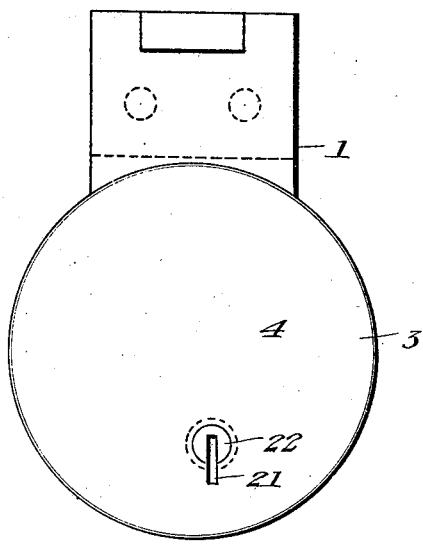
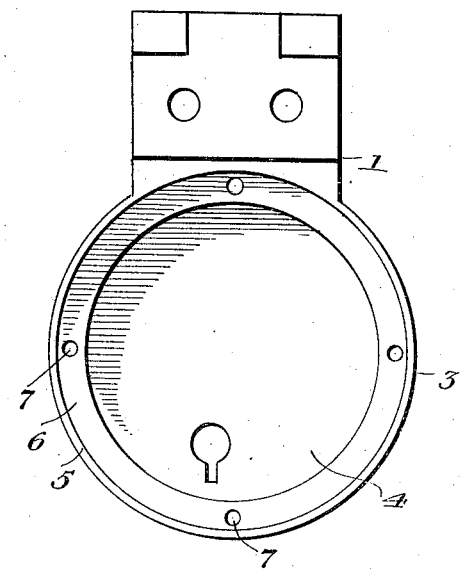
Fig. 3.
Fig. 4.
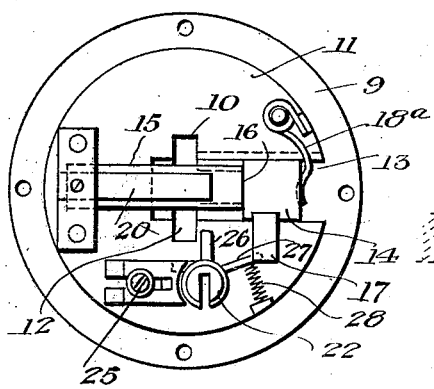
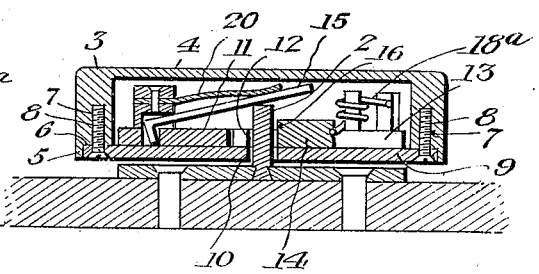
Fig. 10.  Fig. 9.
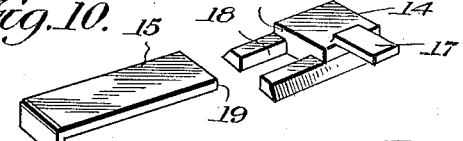
Witnesses
Inventor
R. F. Lindenmuth
By Victor J. Evans
Attorney

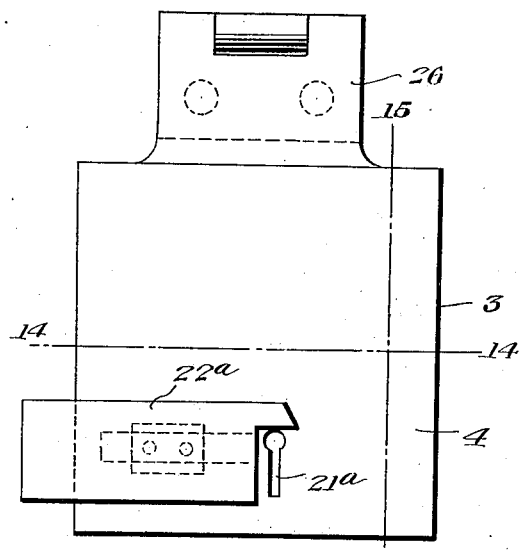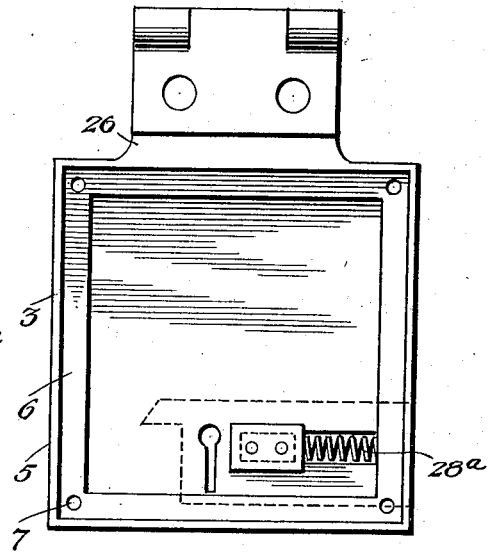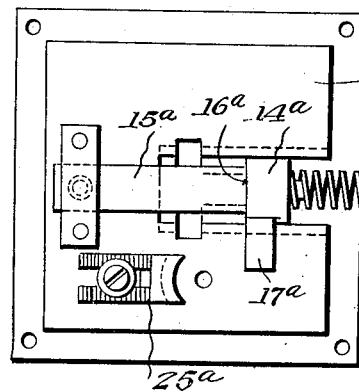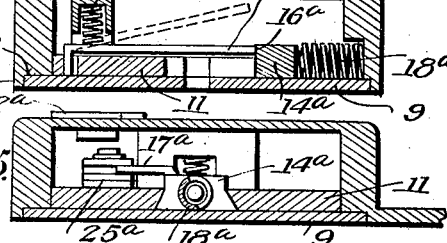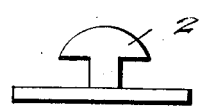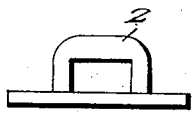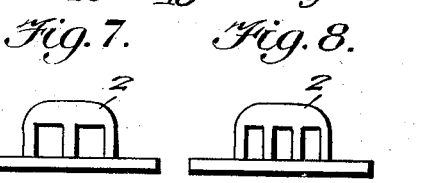

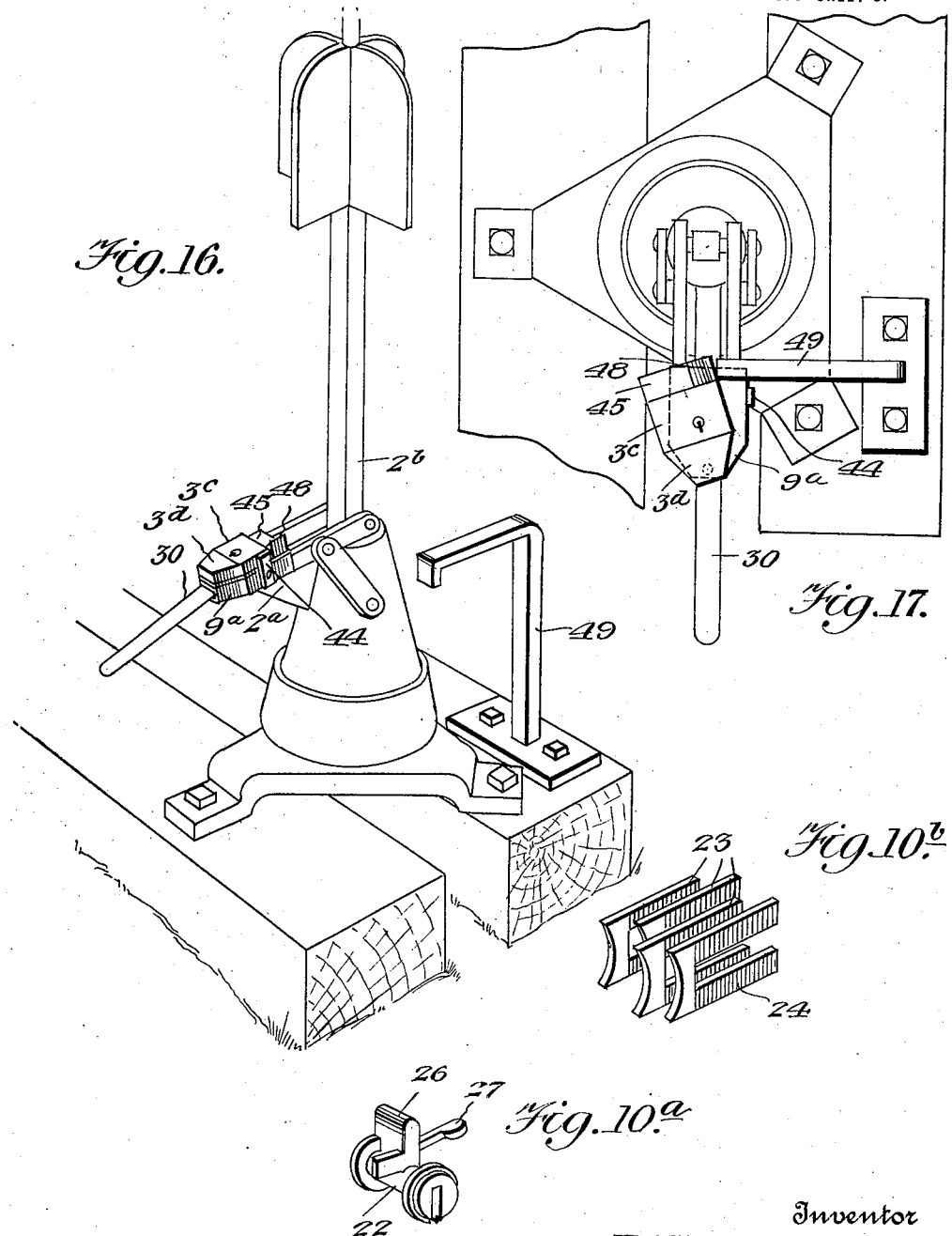

R. F. LINDENMUTH.
AUTOMATIC PADLOCK.
APPLICATION FILED DEC. 17, 1918.
1,335,586.
Patented Mar. 30, 1920.
4 SHEETS—SHEET 4.
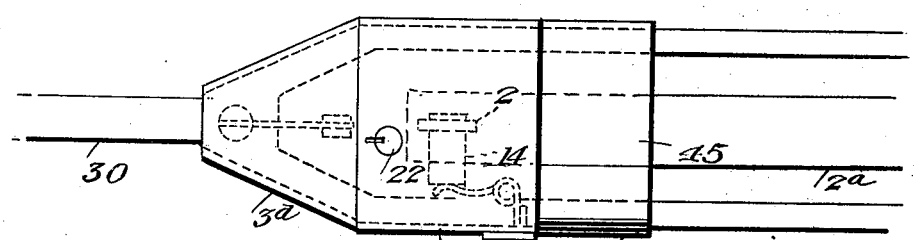
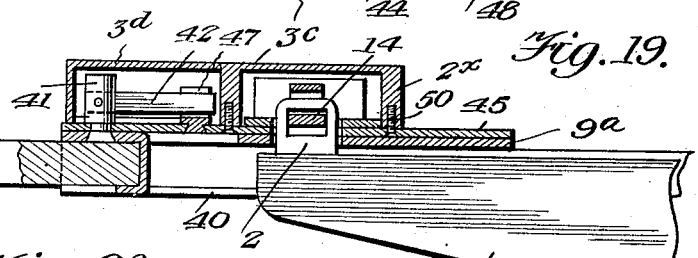
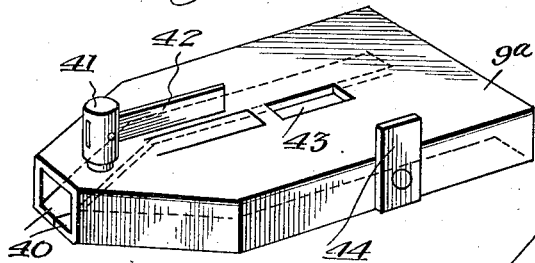
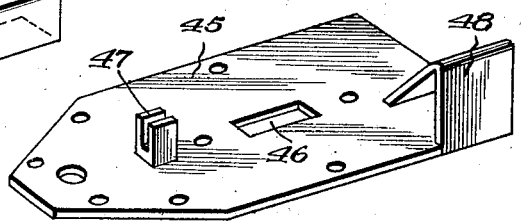
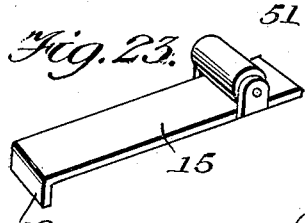
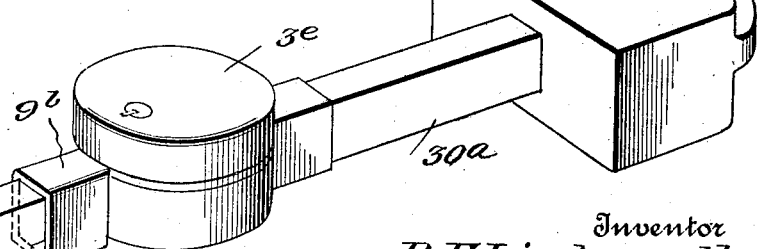
Inventor
R. F. Lindenmuth
By Victor J. Evans
Attorney
Witnesses

UNITED STATES PATENT OFFICE.

RAYMOND F. LINDENMUTH, OF QUAKAKE, PENNSYLVANIA.

AUTOMATIC PADLOCK.

1,335,586.

Specification of Letters Patent. Patented Mar. 30, 1920.

Application filed December 17, 1918. Serial No. 267,196.

*To all whom it may concern:*

Be it known that I, RAYMOND F. LINDENMUTH, a citizen of the United States, residing at Quakake, in the county of Schuylkill and State of Pennsylvania, have invented new and useful Improvements in Automatic Padlocks, of which the following is a specification.

My present invention pertains to locks; and it has for its general object to provide a lock adapted to be used to advantage in various connections and constructed and arranged in such manner that its members may be automatically and strongly engaged by the mere act of pressing one against the other.

The lock, while capable of use to advantage for general purposes, is particularly adapted for use on mail boxes and mail bags and in conjunction with railway switches; and its novelty, utility and practical advantages will be fully understood from the following description and claims, when the same are read in connection with the drawings, accompanying and forming part of this specification.

In the drawings:

Figure 1 is a view showing my novel lock in general circular form.

Fig. 2 is a detail view showing the interior of the lock casing.

Fig. 3 is a plan view showing the base of the lock and the working parts thereof, with the mechanism unlocked.

Fig. 4 is a diametrical section of the lock.

Figs. 5, 6, 7 and 8 illustrate different forms of keeper members that may be employed in the lock.

Fig. 9 is a detailed view of the bolt comprised in the lock.

Fig. 10 is a detail view of the lever complementary to the bolt.

Figs. 10$^a$ and 10$^b$ are detailed views hereinafter explicitly referred to.

Figs. 11 to 15 are views illustrative of a modification of my invention designed for embodiment in a rectangular lock.

Fig. 16 is a view showing my improvement applied to switch operating mechanism and with the mechanism in the position it occupies when a switch is set for a clear main track.

Fig. 17 is a plan view of the same with the switch set for a siding.

Figs. 18 to 21, inclusive, are details of the said installation.

Fig. 22 is a detail perspective of a modification hereinafter referred to.

Fig. 23 is a detail perspective showing the anti-friction roller on the detent of the switch lever installation.

Referring by numerals to the said drawings and more particularly to Figs. 1 to 10, 10$^a$ and 10$^b$ thereof, 1 designates what I will denominate the keeper-carrying member of my novel lock mechanism. The keeper 2 may be of any one of the constructions shown in Figs. 5 to 8, or of any other construction compatible with the purpose of my invention.

The casing for the mechanism to receive and engage the keeper 2 is numbered 3 and is made up of a face wall 4 and marginal flange 5. The said flange 5 is provided with an interior shoulder 6, and in said shoulder are threaded apertures 7 for the reception of screws 8 through the medium of which the base plate or wall 9 of the lock is strongly connected to the casing 3. The base plate 9 is adapted to be opposed to the keeper-carrying member 1 when the lock is closed, and from this it follows that with the lock in a closed state access cannot be gained to the interior mechanism of the lock without destroying the casing 3. This manifestly is an important advantage, especially where the lock is used in conjunction with mail boxes and switch manipulating or controlling means.

The base plate 9 is provided with a slot 10 for the passage of the keeper 2, and on the inner side of said base plate is provided a sub-plate 11. The said sub-plate is slotted at 12 and recessed at 13, and it is provided for the stronger holding of the keeper 2 and also to guide and reinforce the bolt 14, and to permit of the strong connection of the lever or detent 15. The side walls of the recess 13 are undercut to better hold the correspondingly beveled bolt body, and on the said body is an abutment 16 and a lateral arm 17. The forward portion of the bolt body is bifurcated as indicated by 18 to engage a shank of the particular keeper that is employed. The body of the bolt 15 is backed by a spring 18$^a$, which may be of any suitable description, without affecting my invention, and which tends to force the bolt rectilinearly toward the point 19 of the lever 15. By virtue of the construction thus far described, it will be manifest that the lever or detent 15, when engaged at its free end with the abutment 16 of the bolt 14, will strongly hold the said bolt in retracted position. When, however, the keeper 2 is forcibly introduced or enters through the slots 10 and 12, the said keeper will operate to disengage the lever 15 from the bolt abutment, whereupon the spring will immediately and strongly force the bolt in engagement with the transverse portion of the keeper 2 so as to strongly connect the keeper, no matter by what sort of member it is carried, to the complementary member by which the keeper-engaging mechanism is carried. From this it follows that my novel lock is closed by merely pressing the keeper into engagement with the mechanism complementary thereto; and it also follows that when it is desired to disconnect the member 1 from the complementary member, it is necessary to manipulate the lock mechanism through the medium of a key or other suitable means. The said manipulation of the lock mechanism serves to retract the bolt 14 until its abutment 16 is engaged or opposed to the free end of the bolt lever 15; the said engagement being assured by the suitably mounted spring 20, which operates to press the bolt lever toward the bolt 14.

In the face wall 4 of the casing 3 is provided a key hole 21, and in conjunction with the said key hole I provide a headed and slotted pin 22, which is adapted to be turned about its axis through the medium of a key, and has for its purpose to assist in excluding moisture from the mechanism inclosed in the casing 3.

Turning of the key is controlled by a word construction which may be of any approved type, though I prefer to have it comprise four (more or less) slotted members 23, Figs. 3 and 10$^b$, having opposed roughened surfaces 24 and adjustably fixed to each other by a bolt 25 which is equipped with a nut to clamp the roughened members together. The said word is arranged in the relation shown to the key entrance, and manifestly by reason of the adjustable capacity the word may be changed when occasion demands. Manifestly, the opposed roughened surfaces of the members 23 preclude casual movement or shifting of the said members when the same are adjustably clamped together in the manner described.

As shown in Figs. 3 and 10$^a$, the headed and slotted pin 22 is provided with an arm 26 to engage the lateral arm 17 of the bolt 14, and is also provided with an arm 27 for the engagement of a spring 28. By virtue of the provision of the arm 26 on the shaft 22, only a slight movement of the key is necessary to move the said arm 26 for the purpose of retracting the bolt and releasing the keeper. The arm 27 and the spring 28 are provided in order to return the headed and slotted pin 22 to its normal position subsequently to an operation of the lock mechanism to release the keeper.

By reference to Figs. 11 to 15 the rectangular embodiment of my invention will be understood, inasmuch as similar numerals with exponents are employed in Figs. 11 to 15 to designate the corresponding elements in Figs. 1 to 10. I would point out, however, that in the rectangular embodiment I do not use a headed and slotted pin 22 in conjunction with the key hole 21. On the other hand, in the rectangular form I employ in conjunction with the key hole 21$^a$ a rectilinearly movable or slidable plate 22$^a$. This plate 22$^a$ is normally pressed by a spring 28$^a$ so that it rests over the key hole 21$^a$ to prevent rain or moisture from gaining access to the lock mechanism. Manifestly, the plate 22$^a$ may be moved back out of the way against the action of its spring when it is desired to insert a key into the lock.

It will also be observed by reference to Figs. 13 and 14 that the rectangular embodiment of the invention comprises a bolt 14$^a$ having an abutment 16$^a$ and also having a lateral arm 17$^a$, a detent 15$^a$, a coil spring 20$^a$ backing said detent, a coil spring 18$^a$ backing the bolt, and a word construction comprising members 25$^a$ and similar in construction to the word-construction shown in Figs. 3 and 10$^b$.

In both of the embodiments of my invention thus far described the casing 3 is preferably carried by an arm 26, which is hinged as shown at a point adjacent to the casing 3, though it may be hinged at a point remote from said casing without affecting my invention.

The general operation of the rectangular embodiment of the invention is analogous to that hereinbefore set forth with reference to the circular form, and it is therefore deemed unnecessary to reiterate the said operation.

The embodiment of my invention shown in Figs. 16 to 21 operates on the same principle as the embodiment shown in the preceding figures; in Fig. 17 the lock appears with the switch operating mechanism in the position that the latter assumes when adjusted to afford an entrance into a railway siding.

In Fig. 16 the lock is shown with the switch lever 30 in normal position—i. e., position to afford a clear main track. In the latter position the lock is engaged with the keeper 2 on the arm 2$^a$ of the switch shaft 2$^b$, and it will be manifest from this that when the switch lever is moved to said position the lock is quickly and automatically closed of itself by the mere act of moving the switch lever 30 downwardly to the position shown in Figs. 16, 18 and 19. The casing 2$^x$ of the lock is arranged as shown, and in conjunction with the same is employed a sleeve member $9^a$, which is fastened permanently to the lever 30 by means of inwardly directed flanges 40. The sleeve member $9^a$ carries a post 41 that is permanently fastened thereto. The said post carries a spring 42. The sleeve $9^a$ is slotted at 43 for the passage of the keeper 2, and is equipped at 44 with an upstanding stop. The post 41 serves for the pivotal connection of the lock casing $3^c$ and the supplemental casing $3^d$ for the protection of the spring 42. The said post 41 also serves for the pivotal connection of the swinging plate 45, which is slotted at 46 for the passage of the keeper 2 and is provided with a bifurcated upright 47 and an abutment 48. The upright 47 receives the spring 42 so that said spring tends to normally hold the plate 45 in registration with the sleeves $9^a$ and against the stop 44 of said sleeve. It will be gathered from the foregoing that with the switch operating mechanism in the position shown in Fig. 16 the mechanism in the casing $3^c$, which corresponds in construction to the mechanism in the casing 3 of Fig. 4, is adapted when the switch lever 30 is swung downwardly to engage the keeper 2. When, however, the switch lever 30 is swung horizontally, the abutment 48 on the plate 45 will bring up against a tappet 49, with the result that the plate 45 and the casing $3^c$, $3^d$ will be swung laterally to take their slots out of registration with the slot 43 in the sleeve $9^a$, with the further result that the slot mechanism in casing $3^c$ cannot engage with the keeper on the arm $2^a$. When, however, the switch lever is swung in a direction away from the tappet 49, the spring 42 will operate to return the plate 45 and the casing $3^c$, $3^d$ to the position shown in Fig. 16 relative to the sleeve $9^a$. From this it follows that through the medium of my improvement the switch operating mechanism may be locked in position for a clear main track, but cannot be locked in a position for a siding, and hence there is no liability of the switch operating mechanism being locked in the wrong position.

The plate 45 corresponds to the base plate 9 of the embodiment shown in Figs. 1 to 10, and it is connected as shown to the casing $3^c$, the connection being preferably effected by screws 50.

At this point I would have it understood that in the switch embodiment of my invention the lever or detent 15 of the lock mechanism is preferably provided with an antifriction roller 51 to bear against the spring that backs said detent, this provision being made necessary by the fact that the pressure must be heavy in order to bring about the ejection or displacement of the switch lever and the lock mechanism carried thereby when said lock mechanism is released from the keeper 2 on the arm $2^a$.

In Fig. 22 I show my improvement as applied to a different form of switch lever $30^a$. In this application a sleeve $9^b$ is secured on the lever, said sleeve having a slot for the entrance of the keeper and being secured or otherwise connected to the bottom of the casing $3^e$. In this construction, the lever $30^a$ is weighted and is pivotally connected to a support remote from the weight and is adapted to be swung into and out of engagement with a keeper not shown, located on a support at a suitable distance from the center of movement of the lever $30^a$. In this application of my invention the lock is engaged with the keeper when the lever $30^a$ is in position for a clear main track, and is not adapted to engage with the keeper when the lever is thrown out of said position.

It will be apparent from the foregoing that I have provided a lock that is at once simple, compact and reliable; also, that the construction of the lock is such as to assure certain and strong engagement of the lock members when the lock is closed, and this in such manner that with the lock in closed position no way whatever is afforded for gaining access to the interior mechanism of the lock except through the medium of the key appropriate to the lock.

The constructions herein shown and described, constitute the best practical embodiments of my invention that I have as yet devised, but I desire it distinctly understood that in the future practice of the invention various changes in the form and relative arrangement of parts may be made without involving departure from the scope of my invention as defined in my appended claims.

Having described my invention, what I claim and desire to secure by Letters Patent, is:—

1. The combination in a lock, of a casing having an entrance in one of its walls for a keeper on a removable member, a bolt movable endwise at the inner side of said wall and having a transverse aperture for the passage of said keeper and means to enter the keeper and also having a transverse abutment at its side remote from the casing wall, a movable detent normally resting parallel to the bolt at the side thereof remote from said casing wall and extending over the aperture in the bolt and bearing at its end against said abutment of the bolt, a spring disposed back of the detent and yieldingly holding the same in said position, and a spring bearing against the bolt and adapted to move the same endwise upon disengagement of the detent from the bolt.

2. The combination in a lock, of a casing having an entrance in one of its walls for a keeper on a removable member, a bolt movable endwise at the inner side of said wall and having a transverse aperture for the passage of said keeper and means to enter the keeper and also having a transverse abutment at its side remote from the casing wall, a movable detent normally resting parallel to the bolt at the side thereof remote from said casing wall and extending over the aperture in the bolt and bearing at its end against said abutment of the bolt, a spring disposed back of the detent and yieldingly holding the same in said position, and a spring bearing against the bolt and adapted to move the same endwise upon disengagement of the detent from the bolt; the said casing wall being provided with a sub-wall in which the bolt is guided and held against lateral deflection and in which is an aperture, and the said detent having an angular end portion seated in said aperture.

In testimony whereof I affix my signature.

RAYMOND F. LINDENMUTH.